(12) United States Patent
Michioka et al.

(10) Patent No.: US 6,685,354 B2
(45) Date of Patent: Feb. 3, 2004

(54) GUIDE APPARATUS

(75) Inventors: Hidekazu Michioka, Tokyo (JP);
Tomozumi Murata, Tokyo (JP)

(73) Assignee: THK Co., Ltd., Tokyo (JP)

( * ) Notice: Subject to any disclaimer, the term of this patent is extended or adjusted under 35 U.S.C. 154(b) by 56 days.

(21) Appl. No.: 09/987,583

(22) Filed: Nov. 15, 2001

(65) Prior Publication Data

US 2002/0067869 A1 Jun. 6, 2002

(30) Foreign Application Priority Data

Nov. 17, 2000 (JP) ..................... P.2000-351200

(51) Int. Cl.$^7$ .............................. F16C 29/06
(52) U.S. Cl. ........................................ 384/45
(58) Field of Search ................. 384/45, 43, 44; 464/168

(56) References Cited

U.S. PATENT DOCUMENTS 5,927,858 A    7/1999  Agari

FOREIGN PATENT DOCUMENTS

| EP | 0644342 A1 | 3/1995 |
|---|---|---|
| EP | 1 199 487 A1 | 4/2002 |
| GB | 2322674 A | 9/1988 |
| GB | 2233050 A | 1/1991 |
| JP | 56-2206 | 1/1981 |
| JP | 61-137115 | 8/1986 |
| JP | 4-39416 | 4/1992 |
| JP | 07-317762 | 12/1995 |
| JP | 09-291937 | 11/1997 |
| JP | 09-303388 | 11/1997 |
| JP | 10-047343 | 2/1998 |
| JP | 11-264414 | 9/1999 |
| WO | WO 02/08621 A1 | 1/2002 |

*Primary Examiner*—Lenard A. Footland
(74) *Attorney, Agent, or Firm*—Westerman, Hattori, Daniels & Adrian, LLP (57) ABSTRACT

A guide apparatus includes a track rail having raceway surfaces for rolling elements formed longitudinally, a slider having a load raceway surface opposing the raceway surface and a return path for rolling elements disposed in parallel with the load raceway surface, and having paired reversal-of-direction paths completing an endless circulation path for rolling elements by connecting the load raceway surface with either end of the return path and is attached to the track rail to enable their relative movement, and plural rolling elements susceptible to load at a position between a load raceway surface of the slider and the raceway surface of the track rail and circulating in the endless circulation path. A step where the load raceway surface becomes lower than a sidewall surface at an inner diameter of the reversal-of-direction path is formed at a location where the reversal-of-direction path is connected to the load raceway surface.

5 Claims, 7 Drawing Sheets

GUIDE APPARATUS

BACKGROUND OF THE INVENTION

1. Field of the Invention

The present invention relates to a guide apparatus which is used in a linear guide section of, e.g., a machine tool or a like tool, for the purpose of guiding a movable member, such as a table, over a stationary section, such as a bed, and in which a slider equipped with a plurality of rolling elements, which elements circulate endlessly, freely travels back and forth along a track rail. More specifically, the present invention relates to an improvement for effecting high-speed movement of a slider on the raceway rail.

2. Description of the Related Art

As a guide apparatus of this type, there has hitherto been known a guide apparatus comprising a track rail which is disposed on a stationary section, such as a bed, and has a raceway surface for rolling members, such as rollers, formed therein; and a slider which is attached to the track rail by way of a plurality of rolling elements and travels along the track rail while supporting a movable element such as a table.

The slider has a load raceway surface opposing a raceway surface of a track rail via rolling elements, and a return path disposed parallel to the load raceway surface. Further, the slider comprises a slide block that is movable along the track rail in association with rolling action of the rolling elements, and a pair of end caps. The end caps are fixed to respective end faces of the slide blocks and have a U-shaped turning path (called a "U-turn path). The U-turn path guides, toward the return path, rolling elements which have passed by a position between the load raceway surface of the slide block and the raceway surface of the track rail. The end caps are fixed to the respective end faces of the slide block, as a result of which the load raceway surface is connected to the end of the return path by way of the U-turn path. Thus, an endless circulation path is completed within the slider.

Figure 7:
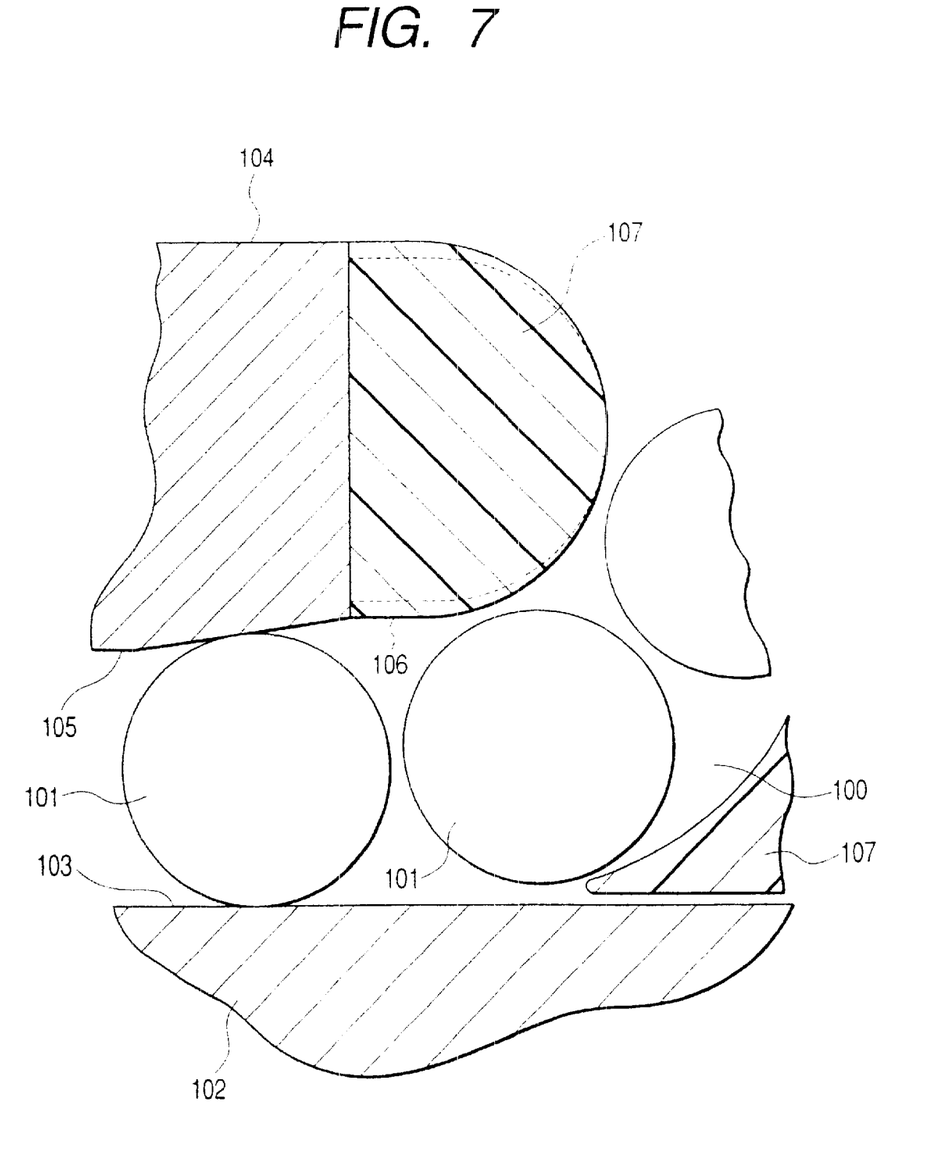
FIG. 7 is an enlarged cross-sectional view showing an example of a junction between a load area and a U-turn path of a related-art linear guide apparatus.

The rolling elements circulating through the endless circulation path of the slider roll through a position between the load raceway surface of the slide block and the raceway of the track rail. More specifically, the rolling elements roll through a load area while receiving the load exerted on the slide block. In a non-load area, the rolling elements are released from load and roll in a non-load state in which no load is exerted on the rolling elements. FIG. 7 is an enlarged cross-sectional view showing a junction between the non-load area and the load area. More specifically, the drawing shows that rolling elements 101 having rolled through a U-turn path 100 without receiving load enter a position between a raceway surface 103 of a track rail 102 and a load raceway 105 of a slide block 104. The load raceway surface 105 of the slide block 104 and the rolling elements 101, such as balls or rollers, are made of steel but are not completely rigid bodies and have slight elasticity. In the load area, the load raceway surface 105 and the rolling elements 101 are susceptible to slight elastic deformation due to load, and in the non-load area the rolling elements are restored to their original shapes upon being released from the load. For these reasons, the inner diameter of the return path and that of the U-turn path 100, which constitute the non-load area, are greater than the diameter of the rolling element 101. However, an interval between the load raceway surface 105 of the slide block 104 in the load area and the raceway surface 103 of the track rail 102 is smaller than the diameter of the rolling element 101. Hence, if the rolling elements 101 having rolled through the non-load area abruptly enter the load area, the rolling elements 101 are subjected to abrupt compression at the entrance of the load area. As a result, large resistance is imposed on circulation of the rolling elements 101, and noise associated with circulation of the rolling elements 101 becomes greater. For these reasons, in order to smoothly and resiliently deform the rolling elements 101 which enter the load area from the non-load area, each longitudinal end of the load raceway surface 105 has hitherto been subjected to crowning. Each end of the load area is slightly broadened, in the form of a bell bottom, toward the non-load area. By means of such broadening of the load area, the rolling elements 101 that have rolled into the load area from the non-load area roll to the depth of the load area, thereby diminishing circulation resistance and noise of the rolling elements 101.

As mentioned above, the U-turn path 100 constituting the non-load area is defined by the end cap 107 differing from the slide block 104 that has the load raceway surface 105 formed thereon. In order to effect smooth transfer of the rolling elements 101 between the non-load area and the load area, the end cap 107 must be positioned accurately in relation to the slide block 104. In the related art, an attempt has been made to increase positional accuracy in attaching the end cap 107 to the slide block 104, by means of fitting a boss projecting from the end cap 107 into a recessed hole formed in the end face of the slide block 104, thereby completely matching the edge of the crowned load raceway surface 105 to a sidewall surface 106 at the interior diameter of the U-turn path 100.

Even when positional accuracy in mounting the end cap 107 relative to the slide block 104 has been increased, the sidewall surface 106 at the interior diameter of the U-turn path 100 becomes lower than the edge of the load raceway surface 105, by virtue of the relationship between accuracy in formation of the load raceway surface 105 and accuracy in formation of the plastic end cap 107, as indicated by broken lines shown in FIG. 7. Eventually, there may arise a case where the edge of the load raceway surface 105 projects slightly at a junction between the load raceway surface 105 and the U-turn path 100. In this way, if the rolling elements 101 enter the load area from the U-turn path 100, the rolling elements 101 collide with the edge of the thus-projecting load raceway surface 105. Such a collision does not pose a serious problem when the slider travels along the track rail at a low speed; however, the collision poses a noticeable problem when there is a necessity of increasing the speed at which the slider is to travel along the track rail. Hence, if the speed at which the slider travels along the track rail is increased, within a given period of time a larger number of balls come to collision with the load raceway surface. As a result, resistance imposed on circulation of the rolling elements or noise becomes noticeable. Further, since impact energy is proportional to the square of speed, the edge of the projecting load raceway surface becomes vulnerable to damage.

A semi-circular guide section situated at the interior diameter of the U-turn path 100 has hitherto been attached to an end cap or a slide block. However, in order to increase an accuracy in formation of an endless circulation path, there has recently been practiced direct formation of the semi-circular guide section at the end face of the slide block by means of injection molding of synthetic resin (as described in Japanese Patent Application Laid-Open No. 317762/ 1995). Even in that case, difficulty is encountered in matching the edge of the load raceway surface to the inner side surface of the U-turn path having a semi-circular guide section provided thereon, without involvement of formation of a step. High-speed circulation of rolling elements has encountered the previous problems.

SUMMARY OF THE INVENTION

The present invention has been conceived in light of the drawbacks and aims at providing a linear guide apparatus which avoids occurrence of collision of rolling elements, which would otherwise arise when the rolling elements roll into a load area from a non-load area, thereby diminishing slide resistance and noise, which would otherwise arise when a slider moves at high speed relative to a track rail.

In order to achieve the object, ideally the load raceway surface completely matches and becomes continuous with the sidewall surface at the inner diameter of the U-turn path when the linear guide apparatus is assembled. However, preset tolerances are present in accuracy of formation of individual components or positioning accuracy. In order to realize an ideal match between the load raceway surface and the sidewall surface, a slider main body and end caps must be machined with a considerably high degree of accuracy and the thus-machined components must be assembled with a considerably high degree of precision. Therefore, difficulty is encountered in realizing such highly-accuracy machining and assembly of parts.

In the linear guide apparatus according to the present invention, the sidewall surface at the inner diameter of the U-turn path and the load raceway surface are not formed intentionally to become continuous in the location where the U-turn path is connected to the load raceway surface; rather, a step section is intentionally formed such that the edge of an entrance of the load raceway surface becomes higher than the sidewall surface.

By means of such technical means, the longitudinal edge of the load raceway surface is recessed in comparison with the sidewall surface at the inner diameter of the U-turn path. Hence, the rolling elements which attempt to enter a load area from the U-turn path do not collide with the edge of the load raceway surface, and the rolling elements can be smoothly delivered to the load area from the non-load area. Further, the U-turn path originally has an inner diameter greater than the diameter of the rolling element. Hence, even when the sidewall surface at the inner radius of the U-turn path protrudes beyond the edge of the entrance of the load raceway surface, the rolling elements which attempt to enter the U-turn path from the load are not caught by an angle of the sidewall surface. Hence, the rolling elements can be smoothly delivered to the non-load area from the load area.

The step section has a size of about 5% the diameter of the rolling element. The step section of such a size can be readily formed by means of adjusting a tolerance associated with formation of the load raceway surface or the end cap. Further, an allowable range is available for the size of the step section. Hence, formation of the step section is considerably easier than realization of complete match between the sidewall surface and the load raceway surface.

Even when it is impossible to realize a match between the load raceway surface and the sidewall surface at the inner diameter of the U-turn path by means of only setting an accuracy in formation of components or only assembly of accurate components, realization of a match between the load raceway surface and the sidewall surface can be implemented by means of machining the linear guide apparatus after assembly. More specifically, by means of simultaneously grinding the load raceway surface and the sidewall surface, which are adjacent to each other, a protuberance in the edge of the entrance of the load raceway surface relative to the sidewall surface is obviated, thereby finishing the surfaces so as to become continuous without a step. Thereby, there can be ensured ideal continuity between the load area and the non-load area with involvement of only a small amount of labor, thus realizing smooth circulation of rolling elements.

The present invention can be applied to an endless circulation path of a ball spline consisting of a spline shaft and a nut member to travel along the shaft, as well as to an endless ball circulation path of a linear guide apparatus consisting of a track rail and a slider.

DETAILED DESCRIPTION OF THE PREFERRED EMBODIMENTS

Now, a description will be given in more detail of preferred embodiments of the invention with reference to the accompanying drawings.

A linear guide apparatus according to the present invention will be described in detail hereinbelow by reference to the accompanying drawings.

Figure 1:
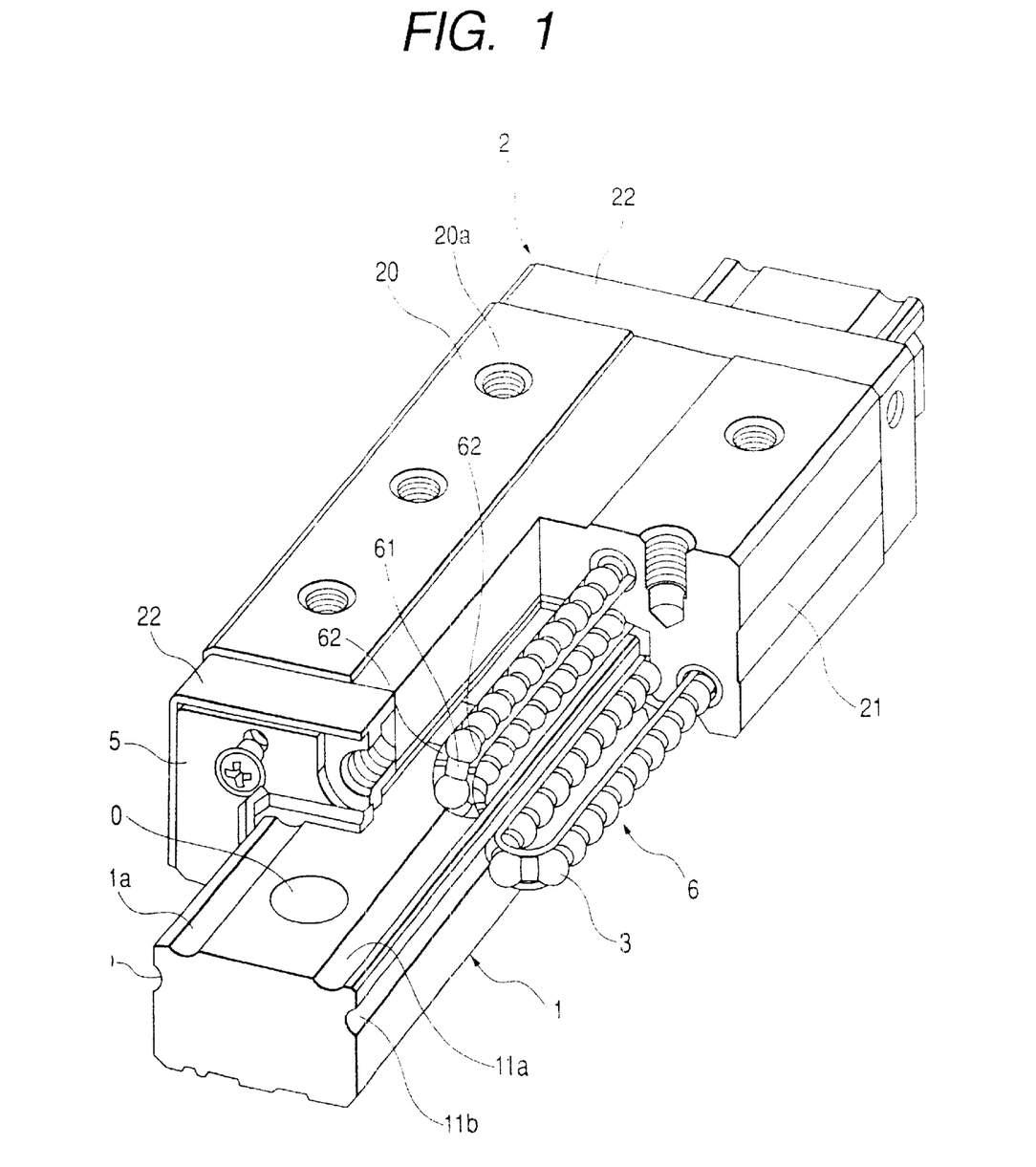
FIG. 1 is a perspective view showing an example of a linear guide apparatus to which the present invention is applied.

FIG. 1 is a cutaway perspective view showing an example of linear guide apparatus to which the present invention is applied. The linear guide apparatus comprises a track rail 1 having a ball raceway 11 formed therein in a longitudinal direction thereof; a slider 2 which is engaged with the track rail 1 via a plurality of balls 3 serving as rolling elements; and a seal member 5 which is attached to an end face at either end of the slider 2 in the direction of movement thereof and which is brought into intimate contact with upper and side surfaces of the track rail 1.

Figure 2:
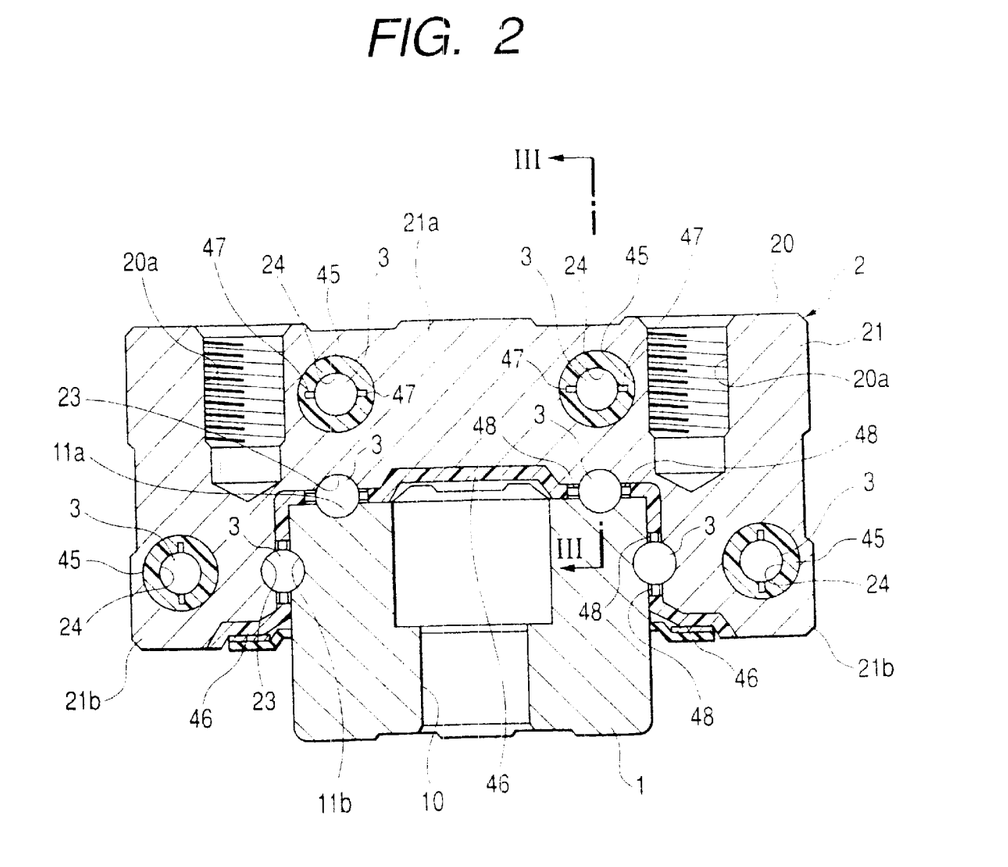
FIG. 2 is a front cross-sectional view showing a linear guide apparatus according to the embodiment.

As shown in FIG. 2, the track rail 1 is constructed so as to assume a substantially rectangular cross-sectional profile when taken along the direction perpendicular to the longitudinal direction of the rail 1. A mount hole 10 to be used for insertion of an anchor bolt is formed at appropriate intervals in the longitudinal direction so as to penetrate through the track rail 1. Two ball race way grooves 11 are formed in an upper surface of the track rail 1 such that the mount holes 10 are interposed between the ball raceway grooves 11. Moreover, one ball raceway groove 11 is formed on either side surface of the track rail 1. Each of the four ball raceway grooves is formed into the form of a deep slot so as to assume a curvature slightly larger than that of a spherical surface of the ball 3.

The slider 2 comprises a metal slide block 21 equipped with amount surface 20 to be used for mounting a slidable member (not shown), such as a table, and a pair of plastic end caps 22, 22, being fixed to either end face of the slide block 21. An indentation is formed in the lower surface of the slider 2 such that an upper part of the track rail 1 is to fit into the indentation with play. Thus, the slider 2 is constructed to as to have a substantially-saddle-like cross-sectional profile.

The slide block 21 has a base section 21*a* having the mount surface 20 formed thereon and a pair of skirts 21*b*, 21*b* extending downward from the respective sides of the base section 21*a*. Thus, the slide block 21 is constructed so as to assume a substantially saddle-like cross-sectional profile. A plurality of tap holes 20*a* to be used for securing a movable member with bolts are formed in the mount surface 20. Two load raceway grooves 23 are formed in the lower surface of the base section 21*a*, and one load raceway groove 23 is formed in an inner side surface of each of the skirts 21*b*. Thus, a total of four load raceway grooves 23 are formed so as to oppose corresponding ball raceway grooves 11 formed in the track rail 1. The balls 3 travel under load in a position defined between the load raceway groove 23 and the ball raceway groove 11 of the track rail 1; namely, a load area. Thereby, the slider 2 travels over the track rail 1.

Figure 3:
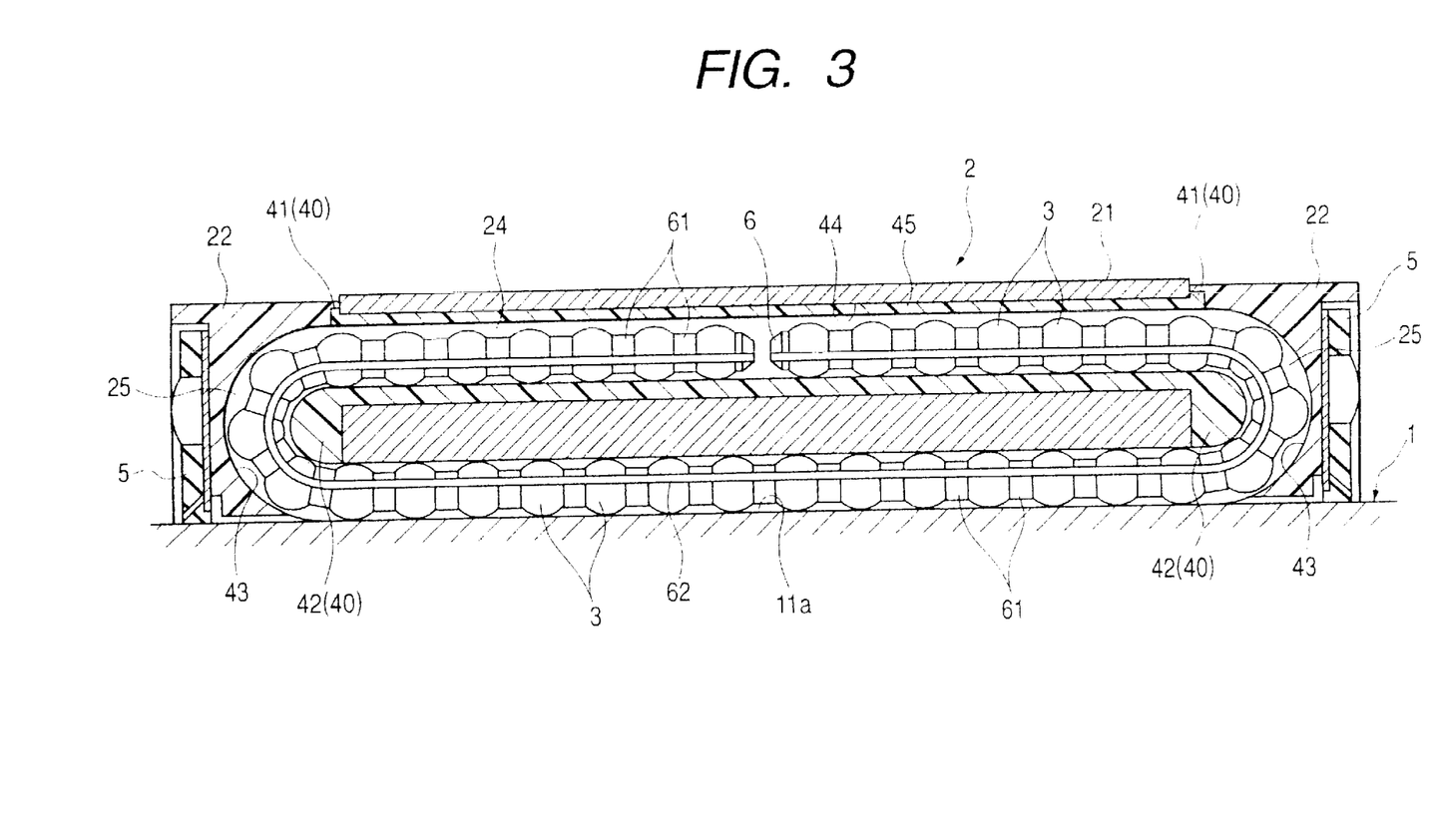
FIG. 3 is a cross-sectional view taken aling line III—III shown in FIG. 2.

Two ball return paths 24 are formed in the base section 21*a* of the slide block 21 by means of drilling, and one ball return path 24 is formed in each of the skirts 21*b* by means of drilling. The ball return paths 24 are disposed in parallel with respective load raceway grooves 23. FIG. 3 is a cross-sectional view showing an endless ball circulation path formed in the slider 2. Each of the ball return paths 24 communicates with a corresponding load raceway groove 23 by means of two substantially-U-shaped reverse-of-direction paths 25 (simply called a "U-turn paths") defined by the respective end caps 22. More specifically, one U-turn path 25 upwardly guides the balls 3 that have finished rolling through the load raceway groove 23 of the slide block 21 and delivers the balls 3 to the ball return path 24, and the other U-turn path 25 delivers the balls 3 from the ball return path 24 to the load raceway groove 23. By means of fastening the end caps 22 to the slide block 21 through use of unillustrated mount bolts, an endless circulation path for the balls 3 is constituted in the slider 2.

As shown in FIG. 3, an end face on either side of the slide block 21 in the direction of movement thereof is covered with a cap attachment section 40 to be used for fixing the end cap 22. A positioning step section 41 for fitting to an inner side surface of the end cap 22 is formed in the cap attachment section 40. When the end cap 22 is fixed to the slide block 21, the positioning step section 41 positions the end cap 22 accurately. The cap attachment section 40 is formed integrally with the slide block 21 by means of a so-called insert molding method, in which melt resin is poured, through injection, into a mold having the slide block 21 provided therein. There may be a case where the cap attachment section 40 is formed through die-casting from light metal, such as aluminum, in lieu of resin. A molding method is not limited to insert molding; the slide block 21 and the cap attachment section 40 may be formed separately, and they may be assembled together later.

A semi-circular guide section 42—which constitutes a sidewall surface at the inner diameter of the U-turn path- protrudes from the cap attachment section 40. The guide section 42 constitutes the U-turn path 25 in cooperation with the end cap 22. A semi-circular guide groove 43 is formed in the end cap 22 and constitutes a sidewall surface at the outer diameter of the U-turn path 25. When the end cap 22 is fixed to the cap attachment section 40, the guide section 42 of the cap attachment section 40 is fitted to the guide groove 43 of the end cap 22, thereby constituting the U-turn path 25.

The cap mount sections 40 attached to both end faces of the slide block 21 are coupled together by way of the ball return path 24. More specifically, the ball return path 24 is formed by means of coating the inner peripheral surface of the through hole 44 formed in the slide block 21 with a plastic tube-like body 45. Such a tube-like body 45 interconnects the pair of cap mount sections 40, 40 covering the end faces of the slide block 21. The tube-like body 45 is formed through insert molding simultaneous with formation of the cap mount section 40, thereby coating the inner peripheral surface of the slide block 21. Accordingly, the cap attachment sections 40 formed at the end faces of the slide block 21 are integral with each other via the tube-like body 45 penetrating through the slide block 21. The cap attachment sections 40 are firmly fastened to the metal slide block 21.

A cladding section 46 made of synthetic resin is formed over the lower surface of the base section 21*a* of the slide block 21 as well as over the inner surfaces of the skirts 21*b*, thereby interconnecting the pair of cap attachment sections 40, 40. The cladding section 46 is also formed through insert molding simultaneous with formation of the cap attachment sections 40 and the tube-like bodies 45. In cooperation with the tube-like body 45, the cladding section 46 firmly fastens the pair of cap attachment sections 40, 40 to the slide block 21. The cladding section 46 is formed to remain away from the load raceway groove 23 for the balls 3 formed in the slide block 21. The cladding section 46 has the function of guiding a belt section of a ball coupling member to be described later.

Figure 4:
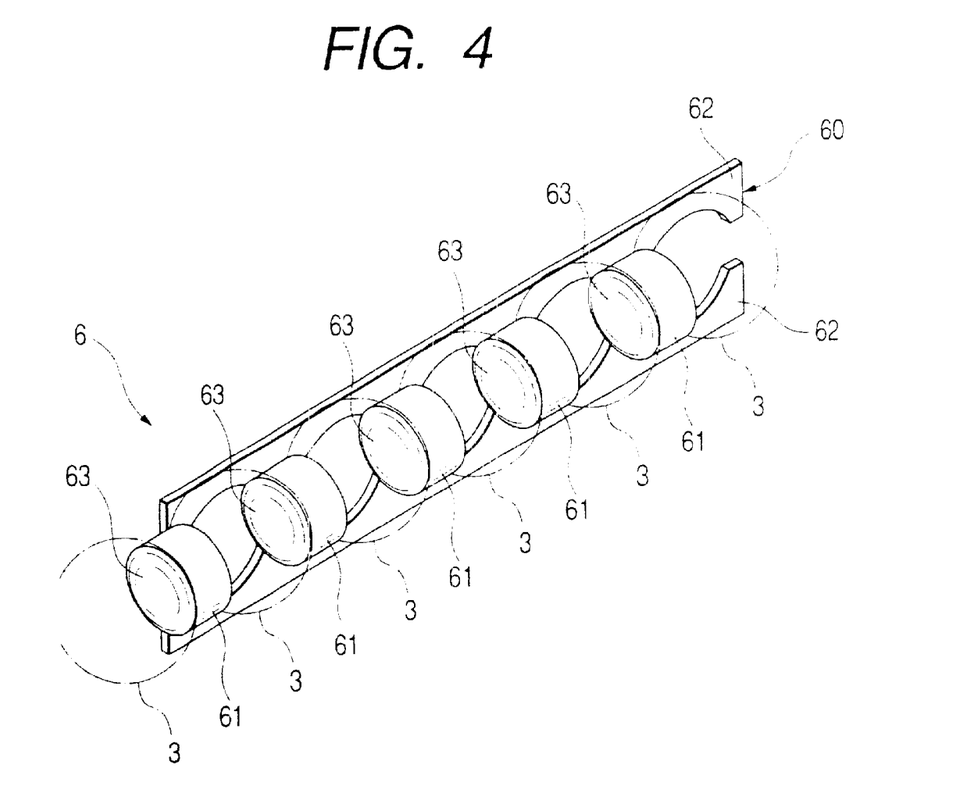
FIG. 4 is a perspective view showing a balls-on-a-string to be incorporated into an endless circulation path of a slider according to the embodiment.

In the linear guide apparatus, the balls 3 are not incorporated in their present forms into the endless circulation path of the slide 2; rather, a plurality of balls 3 are incorporated into the endless circulation path as balls-on-a-string 6 consisting of a string of balls. FIG. 4 shows an example of the balls-on-a-string 6. The balls-on-a-string 6 are formed from a number of balls 3 tied in a string at predetermined intervals with respect to a coupling belt 60. The coupling belt 60 has a plurality of spacer sections 61, each being interposed between adjacent balls 3. The spacer sections 61 are coupled together by means of a belt section 62. On either side of each of the spacer section 61 is formed a spherical seat 63 to be brought into contact with a spherical surface of the adjacent ball 3. Each ball 3 is rotatably embraced by a pair of spacer sections 61 located on the respective sides of the ball 3. In such a state, numerous balls 3 are coupled together by means of the coupling belt 60. As shown in FIG. 3, the balls 3 are incorporated into each endless circulation path of the slider 2 in the form of a single balls-on-a-string 6. In order to prevent occurrence of a kink in the coupling belt 60 while the balls 3 are circulating through the circulation path, a pair of slots 47 are formed in the internal peripheral surface of the plastic tube-like body 45 constituting the return path 24 in the direction in which the balls 3 travel. The belt section 62 of the coupling belt 60 is guided along the slots 47. Similar slots 48 are formed in the areas of the cladding section 46 situated on both sides of each load raceway groove 23 of the slide block 21.

Figure 5:
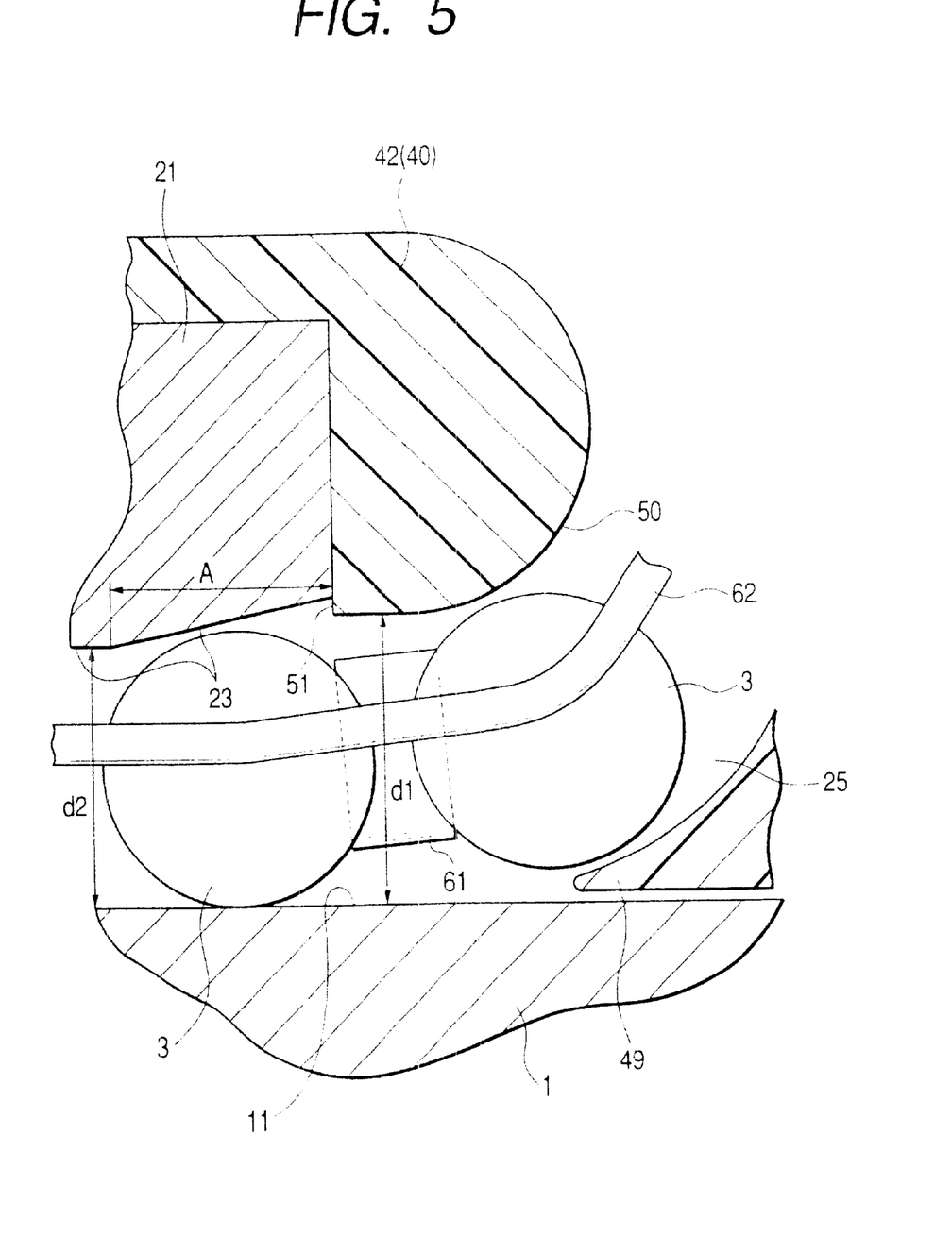
FIG. 5 is an enlarged cross-sectional view showing an example of a junction between a load area and a U-turn path of a linear guide apparatus according to the embodiment.

FIG. 5 is an enlarged cross-sectional view showing a junction between the load area and the U-turn path 25 within the endless circulation path. After having rolled through the U-turn path 25 in a non-load state in which no load is imposed on the balls 3, the balls 3 roll into a load area between the load raceway groove 23 of the slider 2 and the raceway groove 11 of the tack rail 1. In the load area, the balls roll while receiving the load exerted on the slider 2. The inner diameter of the U-turn path 25, which is a non-load area, is set so as to become slightly larger than the diameter of the ball 3. Naturally, the entrance of the U-turn path 25; namely, a distance d1 between the sidewall surface 50 at the inner diameter of the U-turn path 25 and the raceway groove 11 of the track rail 1, is also set so as to become slightly larger than the diameter of the ball 3. In contrast, in the load area, the balls 3 are sandwiched between the load raceway groove 23 of the slider 2 and the raceway groove 11 of the track rail 1 while receiving load. A maximum of distance d2 between the load raceway groove 23 and the raceway groove 11 is substantially identical with the diameter of the ball 3. If load is exerted on the slider 2 or pre-load has been imparted to the balls 3, the distance d2 becomes smaller than the diameter of the ball 3. Hence, if the load raceway groove 23 is formed completely in parallel with the track rail 1 over the entire length of the load area, the balls 3 which enter from the non-load area to the load area are abruptly compressed in a boundary between the areas, thereby hindering smooth circulation of the balls 3. As shown in FIG. 5, a crowing area A is provided in the load raceway groove 23 at either end of the load area. The distance between the load raceway groove 23 and the raceway groove 11 is set so as to gradually broaden while approaching the U-turn path 25. By means of presence of the crowing area A in the load raceway groove 23, the balls 3 that have entered the load area from the non-load area are gradually compressed while advancing and are susceptible to load, thereby realizing smooth circulation of the balls 3 and diminishing noise.

An upward guide 49 is formed at the end of the guide groove 43 of the end cap 22 adjacent to the end of the track rail 1 for guiding the balls 3 so as to depart from the raceway groove 11 of the track rail 1. After having been released from load upon entry into the U-turn path 25 from the load area, the balls 3 depart from the raceway groove 11 of the track rail 1 by means of the upward guide 49 and roll into the depth of the substantially-U-turn path 25.

The semi-circular guide section 42 situated at the inner diameter of the U-turn path 25 is fixed to the slide block 21 by means of injection molding in the manner as mentioned above. Difficulty is encountered in completely matching the longitudinal edge of the load raceway groove 23 with the sidewall surface 50 of the U-turn path 25 formed in the guide section 42. If a complete match fails to exists between the load raceway groove 23 and the U-turn path 25 and if the load raceway groove 23 projects from the sidewall surface 50 toward the track rail 1, the balls 3, which have entered the load area from the U-turn path 25, come into collision with the edge of the load raceway groove 23 even when the crowing area A is provided in the manner as mentioned above. As mentioned above, smooth circulation of the balls 3 is hindered, and noise is likely to arise as a result of abrupt collision of the balls 3 with the load raceway groove 23.

As shown in FIG. 5, the linear guide apparatus according to the present embodiment is intentionally provided with the step section 51, such that the edge of the load raceway groove 23 becomes higher than the sidewall surface 50 at the inner diameter of the U-turn path 25. Even when errors are present in formation of the guide section 42 or formation of the load raceway groove 23, the load raceway groove 23 is prevented from protruding from the sidewall surface 50 of the U-turn path 25 toward the track rail 1. The size of the step section 51 is about 5% the diameter of the ball 3. As a result, the balls 3, which enter the load area from the U-turn path 25, can be prevented from colliding with the edge of the load raceway groove 23, thereby realizing smooth circulation of the balls 3. Such a construction is effective for a case where the balls 3 are to travel at considerably high speed within the endless circulation path. Even when the slider 2 travels at high speed relative to the track rail 1, a linear guide apparatus adopting such a construction can cause the slider 2 to move with considerably small resistance and minimize generation of noise, which would otherwise be caused at the time of movement of the balls 3.

When the step section 51 such as that mentioned above is present, the edge of the sidewall surface 50 of the U-turn path 25 protrudes beyond the load raceway groove toward the track rail 1. A width d1 of the entrance of the U-turn path 25 is greater than the diameter of the ball 3, as mentioned above. Hence, when entering the U-turn path 25 from the load area, the balls 3 are not caught by the step section 51. The upward guide section 49 formed in the end cap 22 is provided at a position where the ball 3 comes into contact with the guide section 49 after having been released from load upon entry into the U-turn path 25. Even after having been released from load, the ball 3 rolls over the raceway groove 11 of the track rail 1 until reaching the upward guide section 49. Even in this respect, there is no chance that the ball 3 which enters the non-load area from the load area is caught by the step section 51.

Figure 6:
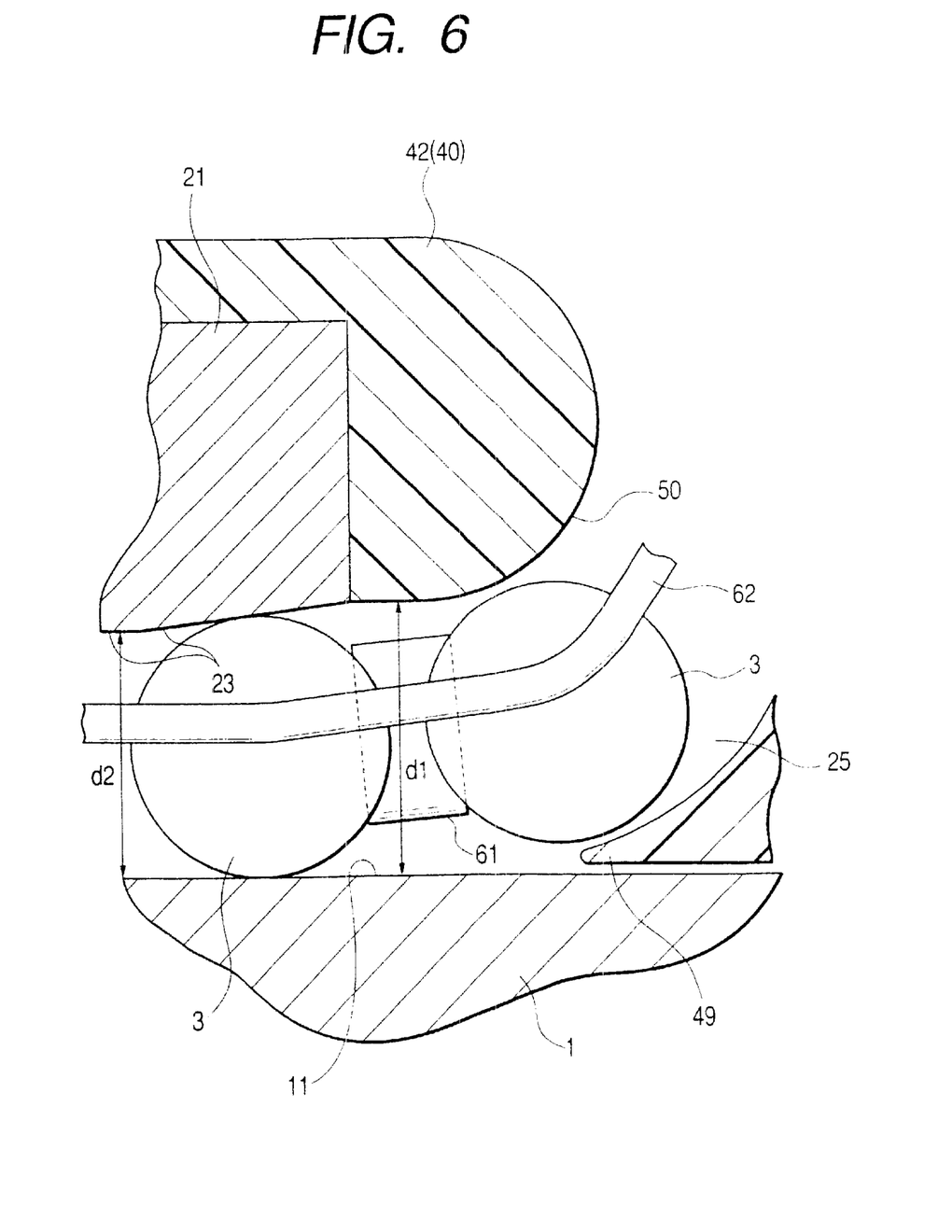
FIG. 6 is an enlarged cross-sectional view showing another example of a junction between a load area and a U-turn path of a linear guide apparatus according to the embodiment.

Even when the step section 51 is not intentionally formed, the crowning area A of the load raceway groove 23 is again ground after the guide section 42 has been formed on the end face of the slide block 21 through injection molding, so that the edge of the load raceway groove 23 can be adjusted so as to match the sidewall surface 50 of the guide section 42. These operations are performed through use of a router. If the crowning area A of the load raceway groove 23 is again ground, there can be achieved a complete match between the load raceway groove 23 and the sidewall surface 50 at the inner diameter of the U-turn path 25, without involvement of a step, as shown in FIG. 6. Thus, the load raceway groove 23 and the sidewall surface 50 can be made continuous. Hence, smooth circulation of the balls 3 can be ensured, as in the case where the step section 51 is formed.

The embodiment has been described through use of the drawings shows an example in which the guide section 42 at the inner diameter of the U-turn path is integrally molded with a metal slide block. However, even in the case of a linear guide apparatus in which the guide section is fixed to the slide block in conjunction with the end cap, smooth circulation of balls can be realized by means of application of the present invention.

In the embodiment, the track rail 1 is formed linearly. However, the track rail 1 may be formed in the form of a curve having curvature.

As has been described, in the linear guide apparatus according to the present invention, rolling elements which attempt to enter a load area from a U-turn path smoothly enter the load area from a non-load area, and vice versa, without being caught by the edge of a load raceway surface. Hence, when the rolling elements roll at high speed within an endless circulation path, there can be prevented occurrence of resistance or noise, which would otherwise be caused by rolling action. There can be achieved considerably smooth and silent, high-speed relative movement between a slider and a track rail.

What is claimed is:

1. A guide apparatus comprising:
   a track rail having raceway surfaces for rolling elements formed in a longitudinal direction thereof;
   a slider which has a load raceway surface opposing the raceway surface and a return path for rolling elements disposed in parallel with the load raceway surface; which has a pair of reversal-of-direction paths completing an endless circulation path for rolling elements by means of connecting the load raceway surface with either end of the return path; and which is attached to the track rail so as to be enable relative movement therebetween; and
   a plurality of rolling elements which are susceptible to load in a position between a load raceway surface of the slider and the raceway surface of the track rail and which circulate in the endless circulation path;
   wherein a step section is defined by having an edge of the load raceway surface to become higher than an edge of a sidewall surface located along the reversal-of-direction path.

2. The guide apparatus according to claim 1, wherein said slider comprises:
   a metal slide block having the load raceway surface and the return path formed therein; and
   a pair of resin-made end caps, being fixed to the respective ends of the slide block and each having the reversal-of-direction path formed therein.

3. A guide apparatus comprising:
   a track rail having raceway surfaces for rolling elements formed in a longitudinal direction thereof;
   a slider which has a load raceway surface opposing the raceway surface and a return path for rolling elements disposed in parallel with the load raceway surface, said slider having a pair of reversal-of-direction paths completing an endless circulation path for rolling elements by means of connecting the load raceway surface with either end of the return path, and said slider being attached to the track rail so as to enable relative movement therebetween; and
   a plurality of rolling elements which are susceptible to load in a position between a load raceway surface of the slider and the raceway surface of the track rail and which circulate in the endless circulation path;
   wherein the slider comprises:
   a slide block having the load raceway surface and the return path formed therein;
   a pair of resin-made end caps being fixed to the respective ends of the slide block and each having the reversal-of-direction path formed therein; and
   a pair of cap attachment sections each having a semi-circular guide section which constitutes a sidewall surface at the inner diameter of the reversal-of-direction path, the cap attachment sections being formed on either end face of the slide block to be used for fixing the end caps,
   wherein the cap attachment sections are formed on the slide block by injection molding using the slide block as a core, and
   wherein a location where the guide section is connected to the load raceway surface is ground after the injection molding so that the guide section becomes continuous with the load raceway surface.

4. The guide apparatus according to claim 3, wherein said slider comprises:
   a metal slide block having the load raceway surface and the return path formed therein; and
   a pair of resin-made end caps, being fixed to the respective ends of the slide block and each having the reversal-of-direction path formed therein.

5. A method for making a semi-circular guide of a slide block, comprising a plurality of steps of:
   forming the semi-circular guide on the slide block by injection molding;
   grinding the semi-circular guide formed by the injection molding so as to make the semi-circular guide to serve as a continuous load raceway surface.

* * * * *